April 2, 1957  H. D. BOONE ET AL  2,787,333
FILTER AND GAS MASK CANISTER EMPLOYING SAME
Filed July 13, 1954

INVENTORS
Harris D. Boone
Miles O. Howell
Robert E. Barry
BY George Renehan
ATTORNEY

United States Patent Office 2,787,333
Patented Apr. 2, 1957

2,787,333
FILTER AND GAS MASK CANISTER EMPLOYING SAME

Harris D. Boone, Baltimore, and Miles O. Howell, Joppa, Md., and Robert E. Barry, New York, N. Y.; said Boone and said Barry assignors to the United States of America as represented by the Secretary of the Army Application July 13, 1954, Serial No. 443,183

7 Claims. (Cl. 183—4.3)

(Granted under Title 35, U. S. Code (1952), sec. 266)

The invention described herein may be manufactured and used by or for the Government of the United States of America for governmental purposes without the payment to us of any royalty thereon.

This invention relates to a filter and a canister employing the same.

An object of this invention is to provide a compact filter offering a minimum resistance to the flow of fluid.

A further object is to provide a filter which is sturdy and which is securely sealed against leakage.

A further object is to provide a filter which is cheap and simple to manufacture.

A further object is to provide a gas mask canister which is compact and light in weight.

In the accompanying drawings.

Figure 1:
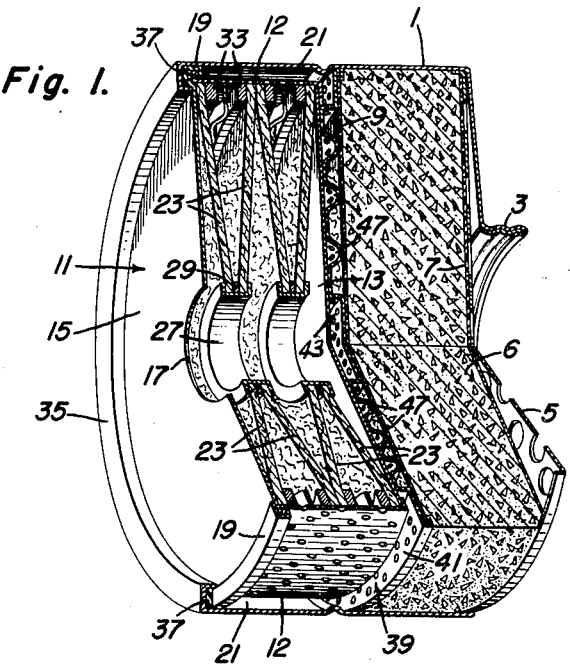
Figure 1 is a perspective view of the canister of our invention partially in section with portions broken away.

Filters of the "stacked" type are known in the gas mask art. Such filters comprise a series of annular filter disks having relatively small central openings. These disks are fastened together successively at their inner and outer edges producing a zigzag structure. Air enters the central openings and flows outwardly, passing through the filter disks on its way. The filters of this type with which we are familiar have, however, been unduly bulky and in addition have frequently been insufficiently strong to stand up in use.

By reason of the manner in which our filter disks are mounted, the filter has a large filter area in proportion to its size and offers a minimum resistance to air. Combined with a standard type of canister body and charcoal bed, it produces a lightweight, highly effective canister having a low resistance to air flow. Due to the simple character of the parts the filter and canister are cheap to manufacture on a mass production basis.

The canister comprises a canister body 1 provided with the usual screw connection 3, for joining the canister to a gas mask, and perforated transverse wall 5. Within the canister is a charcoal bed 6 of conventional type, including porous fibrous pads 7 and 9 forming the boundary sheets.

Figure 2:
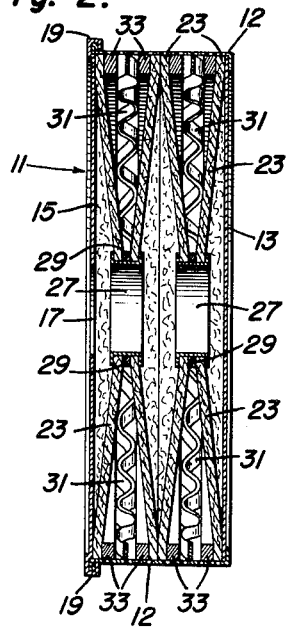
Figure 2 is a radial section of the filter.
Figure 3:
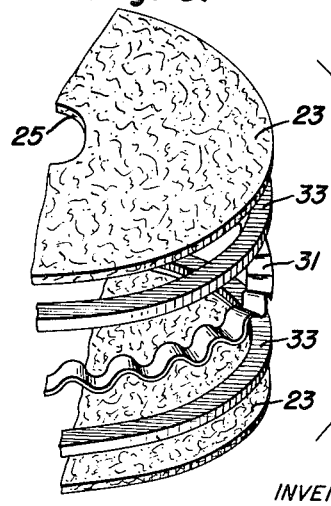
Figure 3 is a fragmentary exploded view showing the relationship of various parts of the filter.

The elements thus far described are conventional. Our contribution lies in an improved filter 11, which is shown separately in Figs. 2 and 3. This filter comprises a perforated cylindrical wall 12 closed at one end by an imperforate end wall 13 and at the other end by end wall 15 which is provided with a central opening 17. Cylindrical wall 12 is crimped within a bead 19 formed by end wall 15. Bead 19 engages canister body 1, leaving a peripheral channel 21 between the canister body and cylindrical wall 12.

The filtering medium comprises frustoconical disks 23 of filter material, e. g., filter paper, having central openings 25. The inner edges are crimped together in pairs by circular grommets 27, a flat cardboard ring 29 being positioned between the sheets of each pair. The outer edges of the sheets of each pair are held apart by spacers 31 which are in the form of sheet metal rings provided with radial corrugations. A flat cardboard ring 33 lies between each sheet and the ring. Alternate sheets are pressed together at the outer edges, so that the filter medium has a zigzag form.

The filter 11 is crimped with canister body 1 at 35 and the joint is sealed by gasket 37.

Between the end plate 13 of the filter and boundary sheet 9 of the charcoal bed is a perforated retaining plate 39 provided with an outer planar portion 41 and a central planar portion 43. The intermediate portion is embossed in such a manner as to permit substantially unimpeded radial flow of air. It may be embossed with spaced hemispherical projections 47, or with radial corrugations.

Air enters the canister through opening 17 and flows generally radially outwardly, passing through filter disks 23 on the way. It then flows through the perforate wall 12 into peripheral channel 21. It is then distributed by perforated retainer plate 39 over charcoal bed 6 through which it flows to connection 3 and thence into the gas mask.

It will be understood that the filter may be used in settings other than gas mask canisters and may be used to filter fluids other than air.

A number of problems which have impeded the development of stacked filters have been overcome or mitigated by the present invention.

The stacked type filters produced by certain foreign countries for use on gas masks have proven unduly bulky for civilian use. The filter herein described has proven effective when made only 1⅛" high by 4.13" in diameter. This is made possible by the high proportion of available filter area made available by the method of sealing and by the low resistance to air flow. The corrugated sheet metal spacers in combination with the cardboard sealing rings support the paper at all points of its periphery and produce a sturdy long-lasting element. The parts are all simple to fabricate and are readily assembled on a mass-production basis.

While we have described our article in considerable detail, it will be obvious that various modifications can be made therein.

We, therefore, desire to be limited only by the scope of the appended claims.

We claim:

1. A filter comprising a perforated substantially cylindrical wall, an imperforate end wall, a perforate end wall, a plurality of filter disks between said end walls, transverse to the axis of said cartridge, each of said disks having an inner edge defining a central opening of relatively small diameter as compared to the diameter of said disk, means sealing the outer edges of said filter disks adjacent said cylindrical wall, and means joining said inner edges together in pairs, each said joining means comprising a narrow flat sealing ring positioned between said inner edges of two filter disks and an annular metal grommet embracing said inner edges and clamping said filter disks against said sealing ring.

2. A filter as defined in claim 1 wherein said means sealing the outer edges of said filter disks comprises flat sealing rings engaging the surfaces of said filter paper sealing rings and spacing means clamping said sealing rings against said filter disks.

3. A filter as defined in claim 2 wherein said spacing means comprise radially corrugated sheet metal rings.

4. A canister for gas masks comprising a substantially cylindrical canister body, a charcoal bed in one end of the canister body and extending across the entire cross section thereof, a porous pad closing each end of said charcoal bed, a filter in the other end of said canister, said filter comprising a cartridge having substantially cylindrical wall of smaller diameter than and spaced from said canister to form a peripheral channel and an imperforate end wall spaced from one of said porous pads to form a transverse channel communicating with said peripheral channel; said filter cartridge further comprising a perforate end wall, a plurality of filter disks between said end walls, transverse to the axis of said cartridge, each of said disks having an inner edge defining a central opening of relatively small diameter as compared to the diameter of said disk, means sealing the outer edges of said filter disks adjacent said cylindrical wall, and means joining said inner edges together in pairs, each said joining means comprising a narrow flat sealing ring positioned between said inner edges of two filter disks and an annular metal grommet embracing said inner edges and clamping said filter disks against said sealing ring.

5. A canister as defined in claim 4 wherein said means sealing the outer edges of said filter disks comprises flat sealing rings engaging the surfaces of said filter paper and spacing means clamping said sealing rings against said filter disks.

6. A canister as defined in claim 5 wherein said spacing means comprises radially corrugated sheet metal rings.

7. A canister as defined in claim 6 and further comprising a perforated retaining plate spacing said imperforate plate from said porous pad, said retaining plate comprising central and peripheral planar portions engaging said porous pad and an intermediate embossed portion engaging said porous pad and said imperforate plate, said intermediate portion being embossed in such a manner as to provide substantially unimpeded radial flow of air.

References Cited in the file of this patent
FOREIGN PATENTS 356,383    Italy _____ Jan. 29, 1938